Figure 1:
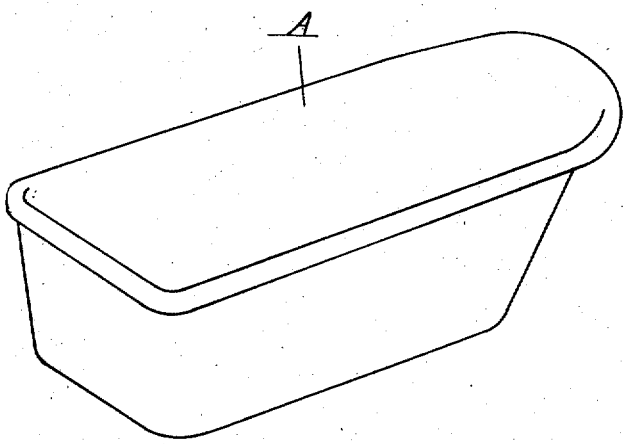

No. 12,539. REISSUED OCT. 9, 1906.

E. H. SLOMAN.

BATH TUB.

APPLICATION FILED SEPT. 5, 1906.

WITNESSES
Amelia Williams
James O. Barry

INVENTOR
EUGENE H. SLOMAN.
BY Whittemore, Hulbert & Whittemore
ATTYS.

UNITED STATES PATENT OFFICE.

EUGENE H. SLOMAN, OF DETROIT, MICHIGAN, ASSIGNOR TO SEAMLESS STEEL BATHTUB COMPANY, OF DETROIT, MICHIGAN, A CORPORATION OF MICHIGAN.

BATH-TUB.

No. 12,539. Specification of Reissued Letters Patent. Reissued Oct. 9, 1906.

Original No. 821,755, dated May 29, 1906. Application for reissue filed September 5, 1906. Serial No. 333,346.

*To all whom it may concern:*

Be it known that I, EUGENE H. SLOMAN, a citizen of the United States, residing at Detroit, in the county of Wayne and State of Michigan, have invented certain new and useful Improvements in Bath-Tubs, of which the following is a specification, reference being had therein to the accompanying drawings.

The invention consists in a bath-tub made of sheet metal, in which the metal is put in a state of rest and free from internal strains, whereby it may be heated and porcelained without distortion, as more fully hereinafter described, and shown in the drawings, in which—

Figure 2:
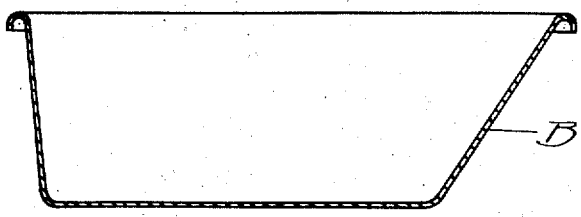

Figure 1 is a perspective view of my improved bath-tub, and Fig 2 is a vertical central section therethrough.

In the present state of the art bath-tubs are made of cast metal and porcelained. The casting of so large a piece of such thin metal and of such a shape is a difficult process, and many castings are defective and are lost in the process of manufacture.

Many attempts have been made to make bath-tubs of sheet metal, and large sums have been expended in such efforts. Such a shape as a bath-tub can be pressed by hydraulic presses; but when so pressed the tub has internal strains, which when the tub cools or when the tub is reheated for applying porcelain distort it or throw it out of its true shape, rendering it useless for marketing purposes. Until my tub was produced I am unaware of any sheet-metal bath-tub which would retain its form in cooling, especially if reheated sufficiently to apply a porcelain coating thereto.

In making my tub A, I preferably first shape it in a die-press to approximately the finished shape. The ordinary press, however, will leave wrinkles or corrugations in the tub at B, and there will remain many internal stresses or strains. This partially-shaped tub I then may put in a press in which the punch member is smaller than the finished article and then by suitable mechanism produce a rolling action upon the metal by the punch member. Such a roller-press is illustrated in the British patent to Sloman, No. 17,904 of 1904. The action of this roller-press is continued long enough to not only shape the tub to its final form, but also to eliminate the internal strains—that is, put the metal at rest in its new form. When the metal has thus been put at rest in the shape of the finished tub, it may be reheated and porcelained in the ordinary manner of applying porcelain, and such reheating and subsequent cooling will not cause the tub to become distorted or misshapen.

Such a tub is much cheaper to manufacture than a cast-metal tub, is much lighter and stronger, and thus reducing freight and danger of breakage in shipment due to rough handling.

While I have referred to the Sloman roller-press as the preferable device to use in finishing the tub and eliminating the internal strains, any other device may be employed which will press or roll the tub into finished shape and put the metal in its new form in a state of rest—that is, free from internal stresses which will distort it in cooling or in reheating and cooling when applying the porcelain.

What I claim as my invention is—

1. A bath-tub made from a single sheet of metal in which the metal is in such a state of rest that it can be reheated without distortion when cooled.

2. A porcelain-coated bath-tub in which the metal body is formed from a sheet of metal in such a state of rest that on reheating it to apply the porcelain it was not distorted when cooled.

In testimony whereof I affix my signature in presence of two witnesses.

EUGENE H. SLOMAN.

Witnesses:
AMELIA WILLIAMS,
NELLIE KINSELLA.